United States Patent [19]

Ohtaki et al.

[11] Patent Number: 4,589,199
[45] Date of Patent: May 20, 1986

[54] APPARATUS FOR ASSEMBLING A DOOR ON A VEHICLE BODY

[75] Inventors: Keizaburo Ohtaki, Saitama; Ryo Niikawa, Sayama; Masahide Kondou, Saitama, all of Japan

[73] Assignee: Honda Giken Kogyo Kabushiki Kaisha, Tokyo, Japan

[21] Appl. No.: 734,731

[22] Filed: May 16, 1985

[30] Foreign Application Priority Data

May 16, 1984 [JP] Japan .................................. 59-96393
May 16, 1984 [JP] Japan .................................. 59-70404[U]

[51] Int. Cl.⁴ ................ B23P 19/00; B23P 11/00;
      B23Q 15/00; B65G 43/10
[52] U.S. Cl. .......................... 29/714; 29/33 K;
      29/33 P; 29/407; 29/430; 29/431; 29/559;
      29/712; 29/791; 29/799; 29/824; 29/DIG. 44;
      198/575; 414/225; 414/786; 901/7; 901/11;
      901/46
[58] Field of Search ............ 29/33 K, 33 P, 407,
      29/429, 430, 431, 469, 559, 700, 703, 705, 707,
      709, 711, 712, 714, 791, 799, 822, 823, 824,
      DIG. 44; 198/339.1, 341, 572, 575; 414/222,
      225, 750, 752, 786; 901/7, 10, 11, 46, 50

[56] References Cited

U.S. PATENT DOCUMENTS

| | | | |
|---|---|---|---|
| 3,968,559 | 7/1976 | Karlsson | 29/430 |
| 4,086,522 | 4/1978 | Engelberger et al. | 29/430 X |
| 4,411,354 | 10/1983 | Thibault et al. | 29/430 X |
| 4,553,309 | 11/1985 | Hess et al. | 29/791 X |

FOREIGN PATENT DOCUMENTS

| | | | |
|---|---|---|---|
| 2405024 | 8/1975 | Fed. Rep. of Germany | 901/7 |
| 3448 | 3/1977 | Japan | 29/430 |
| 36627 | 10/1978 | Japan | 29/824 |
| 5276 | 1/1979 | Japan | 29/824 |
| 83328 | 5/1982 | Japan | 29/823 |
| 23782 | 2/1984 | Japan | 29/700 |

Primary Examiner—Howard N. Goldberg
Assistant Examiner—Ronald S. Wallace
Attorney, Agent, or Firm—Armstrong, Nikaido, Marmelstein & Kubovcik

[57] ABSTRACT

An apparatus including a set jig for setting and positioning a door into a door opening portion of a vehicle body which jig is movable to advance and retreat in the direction of the door opening portion and movable in the vehicle length and height directions from a predetermined original point position (corresponding to a normal set position of the door opening) and a position detecting mechanism for detecting deviation in position of the door opening from the normal set position and for adjusting the alignment of the set jig in accordance with the deviation to have it correspond with the actual position of the door opening portion prior to the set jig advancing to set the door.

2 Claims, 12 Drawing Figures

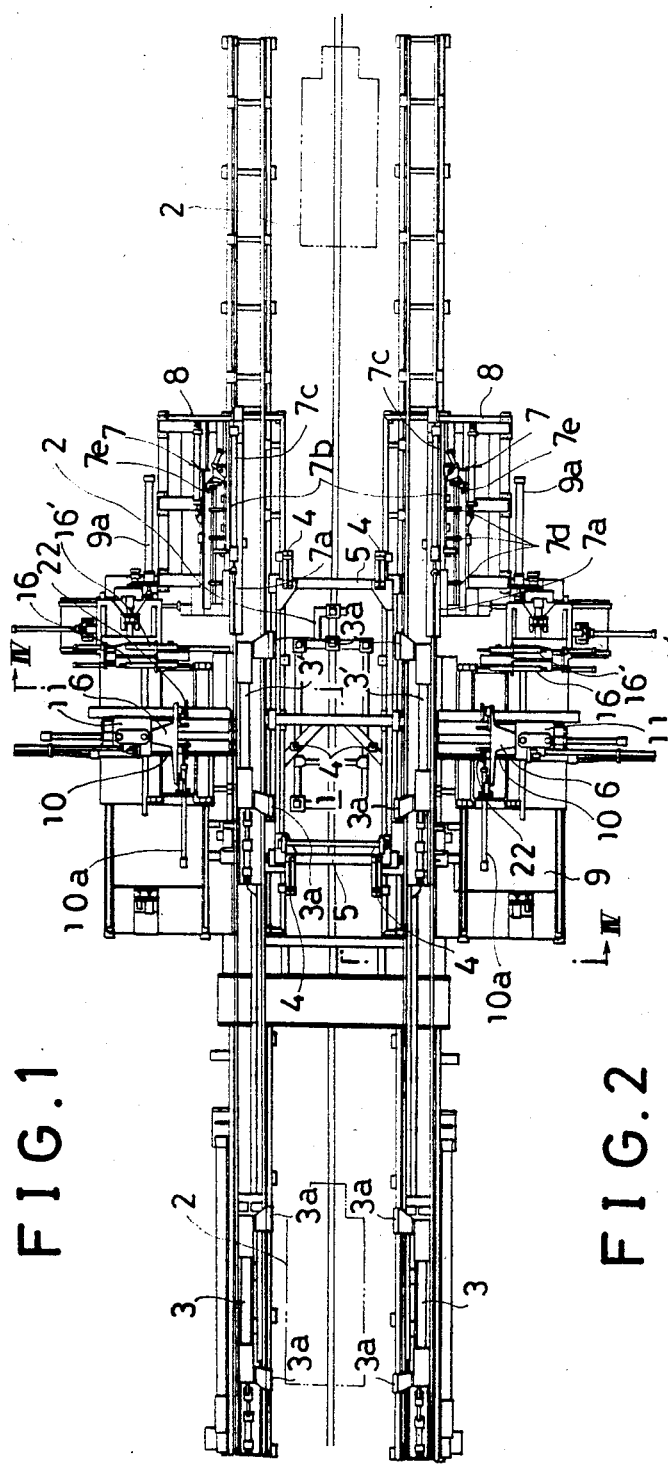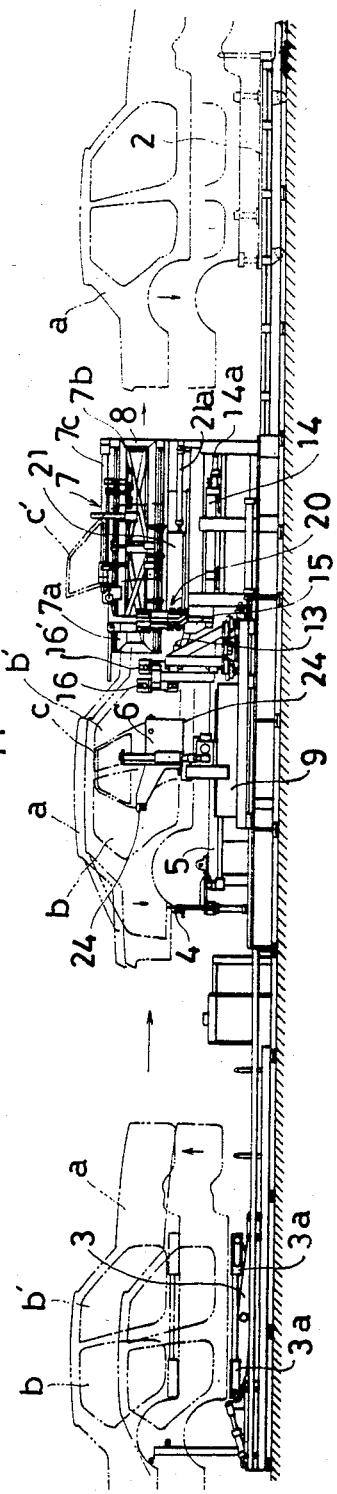
FIG.1
FIG.2

APPARATUS FOR ASSEMBLING A DOOR ON A VEHICLE BODY

BACKGROUND OF THE INVENTION

This invention relates to an apparatus for assembling a door for a vehicle, and is more particularly directed to an assembling apparatus having a set jig for positioning and setting thereon a door provided to the side of an assembling station. The set jig is arranged to be movable to advance toward and retreat from a door opening portion of a vehicle body set on the assembling station so that the door may be assembled with the door opening portion by an advance movement of the set jig.

Usually with this kind of apparatus, as disclosed, for instance, in Japanese Unexamined Patent Application Publication No. Sho 54-5276, a set jig is supported in a floating condition on a frame base which is movable to advance toward and retreat from a vehicle body. A locating member which is to be brought into engagement with a reference opening made in the vehicle body is fixedly provided on the set jig so that before the advance movement of the frame base, the locating member is brought into engagement with the reference opening. While so engaged, the set jig may be moved with the movement of the locating member so as to be set in position at its position corresponding to the door opening portion.

Such a construction, however, is inconvenient in that, because the locating member is forcibly inserted into the reference opening and causes the set jig to move therewith, the vehicle body side is liable to be injured. It often happens that an excessively large force is applied to the locating member. In addition, if a balance mechanism for lightening the movement of the set jig is provided, the apparatus becomes complicated in construction and high in price.

OBJECT AND SUMMARY OF THE INVENTION

This invention has for its object to provide an apparatus which is free from the foregoing inconveniences. That is, it is an object of the invention to make it possible without using a locating member, to bring a set jig into a condition set in position at its position corresponding precisely to a door opening position, before the set jig is advanced.

This invention is used in an apparatus wherein a set jig for positioning and setting thereon a door is provided on a side portion of an assembling station with the set jig being arranged to be movable to advance toward and retreat from a door opening portion of a vehicle body set on the assembling station so that the door may be assembled with the door opening portion by the advance movement of the set jig. The invention is characterized in that the set jig is arranged to be movable in the vehicle length direction and in the vehicle height direction by respective driving sources from a predetermined original point position thereof corresponding to a normal set position of the door opening portion. A position detecting means is provided for detecting a deviation in position of the door opening portion from the normal set position thereof so that the original point position of the set jig may be compensated, before the advance movement of the set jig, in accordance with the deviation in position of the door opening portion by operating the respective driving sources by a signal outputted from the detecting means.

BRIEF DESCRIPTION OF THE DRAWINGS

The above and other objects and the attendant advantages of the present invention will become readily apparent by reference to the following detailed description in consideration and in conjunction with the accompanying drawings wherein:

FIG. 1 is a top plan view of one embodiment of this invention;

FIG. 2 is a side view thereof;

DETAILED DESCRIPTION OF THE PREFERRED EMBODIMENT

Figure 3:
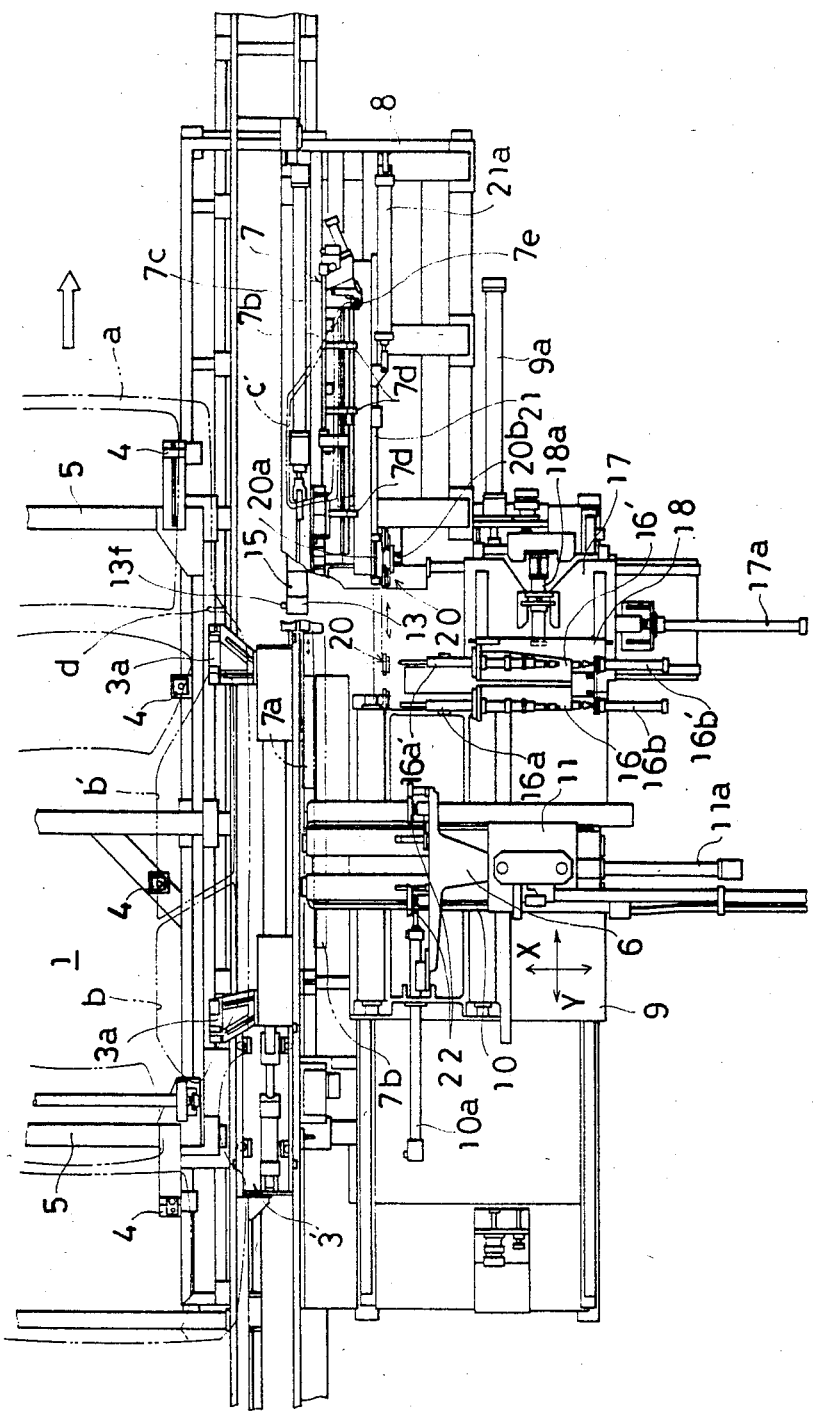
FIG. 3 is a top plan view of an important portion thereof.
Figure 4:
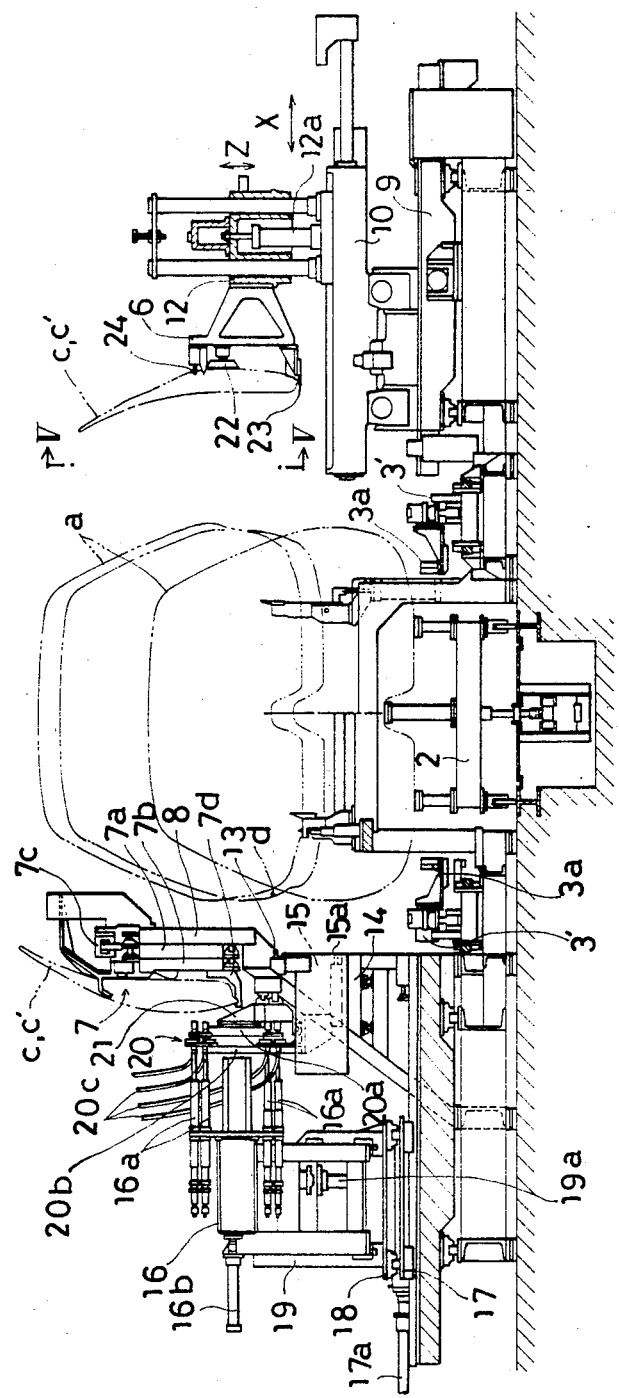
FIG. 4 is a sectional view taken along the line IV—IV in FIG. 1.

One embodiment of this invention applied to an assembling operation of a door for a four door type motorcar will be explained with reference to the accompanying drawings:

Referring to FIGS. 1-4, an assembling station 1 is provided in the middle of a conveying line for a vehicle body a. A conveying carrier 2 is movable along on the conveying line. The vehicle body a mounted on the conveying carrier 2 may be transferred, at a position in front of the station 1, to a pair of loading carriers 3, 3 provided on opposite sides of the conveying line, that is, in the vehicle width direction and having their respective vehicle body receiving means 3a, 3a movable upwards and downwards. The vehicle body a may be conveyed by these loading carriers, 3, 3, and set on a jig table 5 provided at the station 1 having various kinds of positioning members 4. After rear and front doors c, c' are assembled with door opening portions b, b' of the vehicle body a as mentioned hereinafter, the vehicle body a may be conveyed through respective vehicle body receiving means 3a', 3a' of a pair of unloading carriers 3', 3' of almost the same construction as the foregoing loading lift carriers 3, 3 which are movable to reciprocate between the assembling station 1 and a rear position of the assembling station, to the conveying carrier 2 which has previously travelled rearwards through a lower space under the jig table 5 to the rear position.

A set jig 6 for positioning and setting each rear door c and each front door c' is provided on each of both sides of the station 1. On each side, a rear door c is first introduced, for setting, onto the set jig 6 through a door introducing means 7 provided on a side of the set jig and is then assembled with the rear door opening portion b of the vehicle body a. Thereafter, on each side, in almost the same manner as above, a front door c' is introduced, for setting onto the set jig 6 and is then assembled with the front door opening portion b'.

The door introducing means 7 comprises a pair of inner and outer side slide frames 7a, 7b which are supported on a machine frame 8 and are movable in front and rear directions. When the inner slide frame 7a is moved by a cylinder 7c, the outer slide frame 7b is given a double stroke movement through a speed increasing mechanism (not illustrated). Additionally, each of the doors c, c' supplied into the door introducing means from above through a hanger or the like is held by the outer slide frame 7b through a door receiving member 7d and a clamp member 7e provided on the frame 7b and is then conveyed to a predetermined introducing position facing the set jig 6. Then each of the doors c, c' is transferred, at the introducing position, to the set jig 6 and is then set on the set jig 6. The door introducing means 7 may be modified into an elevating and lowering type apparatus for introducing each of the doors c, c' to the introducing position thereof from above.

The set jig 6 is supported on a shift table 9, which is shiftable in front and rear directions, that is, in the vehicle length direction, through a three-dimensional right-angled coordinate type robot mechanism which is movable in the vehicle width direction shown by an X in the drawings, in the vehicle length direction shown by a Y in the drawings and in the vehicle height direction shown by a Z in the drawings. Namely, the robot mechanism is provided on the shift table 9 comprising a first movable frame 10 which is movable in the vehicle length direction, a second movable frame 11 which is provided on the first movable frame 10 and is movable in the vehicle width direction, and a third movable frame 12 which is provided on the second movable frame 11 and is movable in the vehicle height direction. The set jig 6 is supported on the third movable frame 12. Respective driving cylinders 9a, 10a, 11a, 12a are provided for the shift table 9 and the respective movable frame 10, 11, 12.

When it is intended to set a door c or c' on the set jig 6, the sift table 9 is shifted to its front position under the condition that the first movable frame 10 is held in its neutral position, as illustrated, so that the set jig 6 is set in position at its predetermined door receiving position coinciding with the door introducing position of the door introducing means 7. When it is intended to assemble the rear door c with the rear door opening portion b, the shift table 9 is shifted to its rear position, so that the set jig 6 is set in position at its rear side original point position corresponding to a normal set position of the door opening portion b. When it is intended to assemble the front door c' with the front door opening portion b', the first movable frame 10 is moved forwards from its neutral position so that the set jig 6 may be set in position at its front side original point position corresponding to the normal set position of the door opening portion b'.

If, in this case, each of the door opening portions b, b' is located at its normal set position, that is, a side panel having the two door opening portions b, b' is located at its normal set position, each of the doors c, c' can be assembled with each of the door opening portions b, b' by advancing the set jig 6 inwards in the vehicle width direction from each original point position thereof by advancing the second movable frame 11.

In an actual case, however, it is usual that the actual set position of each of the door opening portions b, b' is more or less deviated in position from the normal set position of each thereof in either one or both of the vehicle length direction and the vehicle height direction, owing to an assembling error of the side panel of the vehicle body a or other such errors.

In this respect, according to this invention, there is provided a position detecting means 13 for detecting a deviation in position of each of the door opening portions b, b', that is, a deviation in position of the side panel so that the original point position of the set jig 6 may be adjusted and compensated, prior to the advance movement of the set jig 6, in accordance with the amount of deviation in position of each of the door opening portions b, b' by operating the respective driving sources for moving the set jig 6 in the vehicle length direction and the vehicle height direction, respectively, that is, the respective driving cylinders 10a and 12a for the first movable frame 10 and the third movable frame 12, by a signal outputted from the detecting means 13.

The position detecting means 13 is provided to detect the position of the reference opening d made in a suitable portion of a side surface of the vehicle body a, for instance at a lower portion of a front end of a side panel of the vehicle body a and to calculate a deviation in position of each of the door opening portions b, b' from the normal set position thereof. Namely, the means 13 is supported, through a slide frame 15 which is movable to advance and retreat in the vehicle width direction by a cylinder 15a, on a slide frame 14 which is provided on the machine frame 8 and is movable in the vehicle length direction by a cylinder 14a.

More in detail, as shown in FIGS. 8–11, a first rotary member 13c having a shaft 13b extending longitudinally in either one of the vehicle length direction and the vehicle height direction, for instance, in the vehicle length direction is turnably supported at its shaft 13b on a detecting means main body 13a attached to the slide frame 15. A second rotary member 13e having a shaft 13d extending in the other of the two directions, that is, in the vehicle height direction is turnably supported at its shaft 13d on the first rotary member 13c. A spherical feeler needle 13f which is to be brought into engagement with the foregoing reference opening d is attached to a forward end of an extended portion of the secondary rotary member 13e which extends inwards in the vehicle width direction so that the feeler needle 13f may be moved to incline in any corresponding direction according to any of rotary movements of the two rotary members, 13c, 13e. Additionally, the respective shafts 13b, 13d of the two rotary members 13c, 13e are provided with respective angle detecting elements 13g, 13h comprising rotary type potentiometers for detecting respective rotation angles of those shafts 13b, 13d.

When, with this arrangement, the detecting means main body 13a is set in position at a predetermined position in the vehicle length direction by the slide frame 14 and the frame 14 is then advanced inwards in the vehicle width direction by advance movement of the side frame 15, the feeler needle 13f is brought into engagement with the reference opening d. If a position of the reference opening d deviates in the vehicle height direction or in the vehicle length direction from the normal position, the feeler needle 13f is inclined in the vehicle height direction as shown by chain lines in FIG. 9 about the shaft 13b of the first rotary member 13c or inclined in the vehicle length direction as shown by chain lines in FIG. 10 about the shaft 13d of the secondary rotary member 13e. Accordingly, the positional deviation in each direction of the reference opening d, that is, the positional deviation in each of the vehicle height direction and the vehicle length direction of each of the door opening portions b, b' can be detected from a signal outputted from each of the angle detecting elements 13g, 13h for detecting the rotation angles of the respective shafts 13b, 13d. The original point position of the set jig 6 can be compensated, as mentioned before, by operating the respective driving cylinders 10a, 12a in accordance with the respective deviation amounts.

Figure 12:
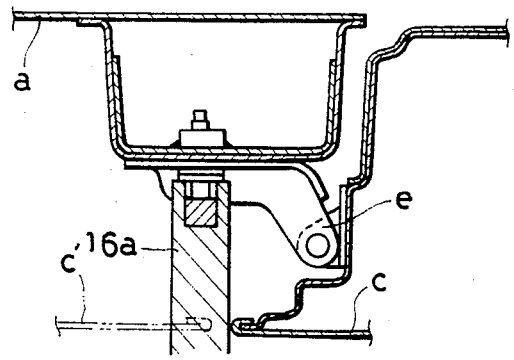
FIG. 12 is a sectional top plan view showing a bolting position of a rear door.
Figure 8:
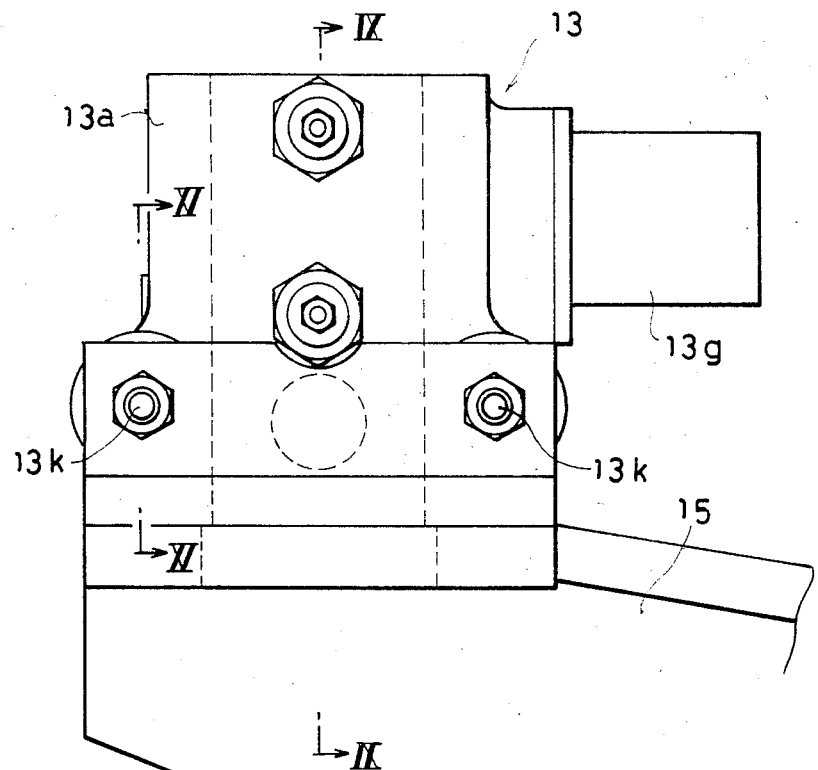
FIG. 8 is an enlarged side view of a position detecting means thereof.
Figure 9:
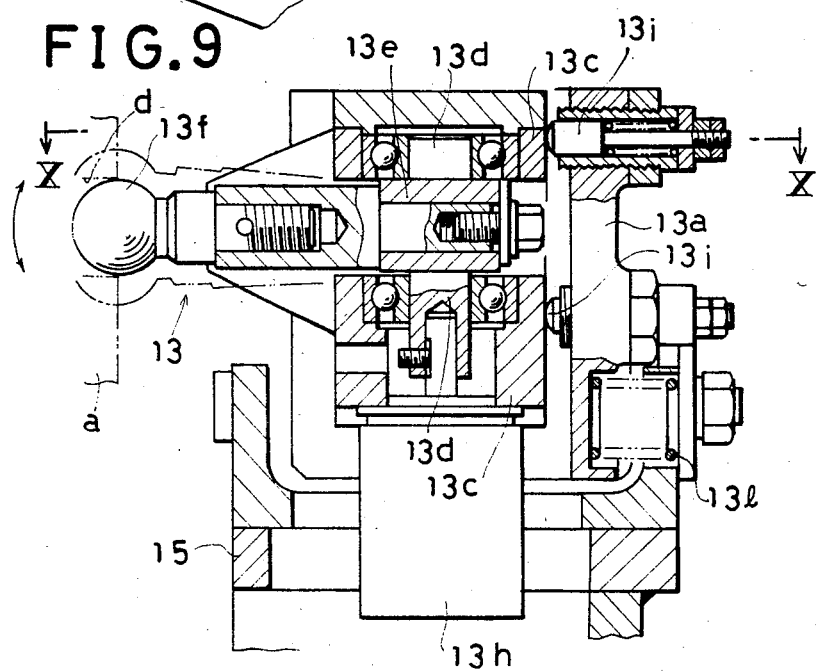
FIG. 9 is a sectional view taken along the line IX—IX in FIG. 8.
Figure 10:
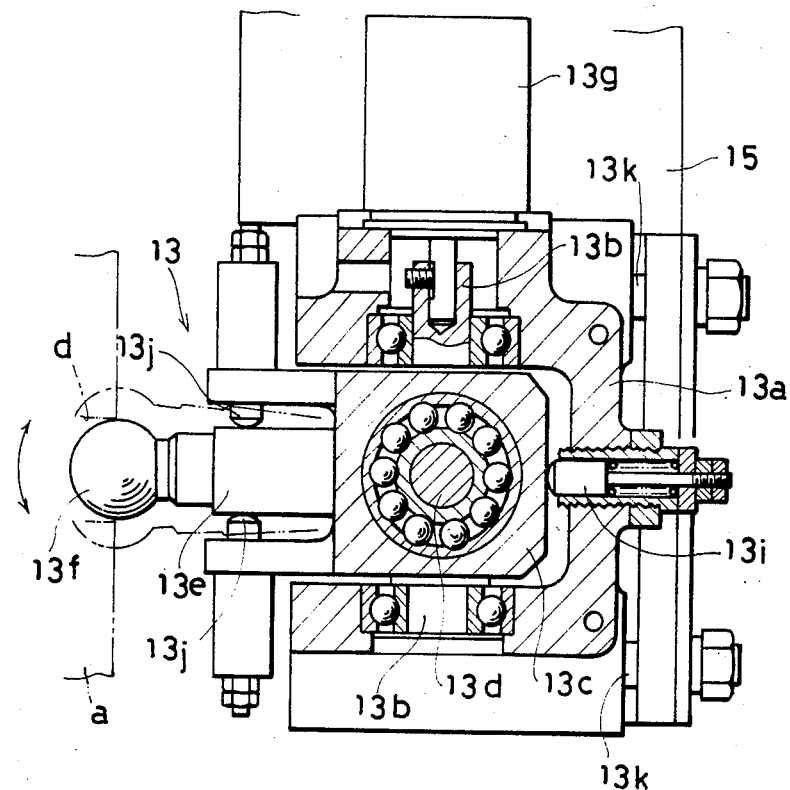
FIG. 10 is a sectional view taken along the line X—X in FIG. 9.
Figure 11:
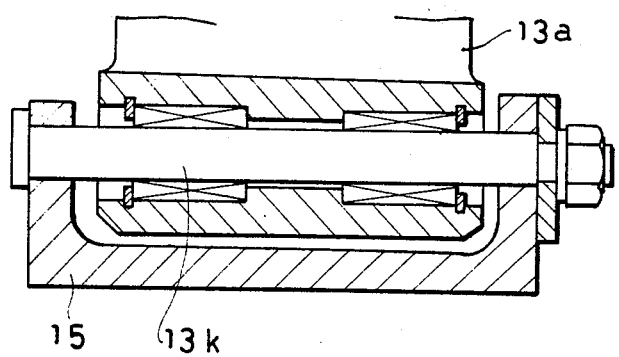
FIG. 11 is a sectional view taken along the line XI—XI in FIG. 8.

The first rotary member 13c and the second rotary member 13e are resiliently held in their neutral positions by a pair of cushion pins 13i, 13i provided on the detecting means main body 13a and a pair of cushion pins 13j, 13j provided on the first rotary member 13c, respectively. The detecting means main body 13a is supported on the slide frame 15, through a pair of guide bars 13k, 13k, and is slidable in the vehicle width direction as shown in FIGS. 8 and 11, so that when the feeler needle 13f is brought into engagement with the reference opening d by the inward movement in the vehicle width direction of the slide frame 15, the detecting means main body 13a can be given a relative outward escaping movement in the vehicle width direction against the action of springs 131 (FIG. 12).

Alternatively, the position detecting means 13 can be constructed as a modified type wherein a feeler needle is attached to a first slide movement member which is slidable in one of the vehicle length and the vehicle height directions through a second slide movement member which is slidable in the other of the two directions, and respective slide movement amounts of the two slide movement members can be arranged to be detected by respective detecting elements comprising potentiometers or the like.

This modified type position detecting means, however, is inconvenient in that since it is necessary that slide movement guide members for the respective slide movement members is provided so as to extend over the whole lengths of the respective slide movement strokes thereof, the detecting means becomes large in size and complicated in construction. Additionally, since each of the slide movement members is moved to slide while being subjected to a turning movement acting on the feeler needle, each of the slide movement members is subjected to an inclination movement, though it is slight. Therefore, it is difficult to apply this modified type means to a door assembling apparatus wherein detecting of an extremely small displacement is required. Whereas, the position detecting means of the foregoing type of construction as illustrated is free from those inconveniences.

A pair of fastening heads 16, 16' for bolting the rear door c and the front door c' at a door hinge e and at a door hinge e', respectively to the vehicle body a are provided on the foregoing shift table 9. More in detail, there is disposed on the shift table 9 a second robot mechanism of three-dimensional right-angled coordinate type having a fourth movable frame 17 movable in the vehicle width direction assembled with a sixth movable frame 19 which is movable in the vehicle height direction, through a fifth movable frame 18 which is movable in the vehicle length direction. The fastening heads 16, 16' having respective plural nut runners 16a, 16a' are provided on the robot mechanism and are driven for feeding inwards in the vehicle width direction by respective individual feeding cylinders 16b, 16b'. Additionally, the respective plural nut runners 16a, 16a' are arranged to have bolts set thereon through a bolt receiving the delivering means 20 provided on the machine frame 8. Thus, at the time of assembling of each of the doors c, c', each of the fastening heads 16, 16' is set in position at its position corresponding to each of the door hinges e, e', by moving the fifth movable frame 18 and the sixth movable frame 19. The heads 16, 16' are then advanced to a predetermined position thereof inwards in the vehicle width direction by moving the fourth movable frame 17. Thereafter, each of the fastening heads 16, 16' is given a feed driving inwards in the vehicle width direction by each of the feeding cylinders 16d, 16d' so as to effect the respective bolting operations. Driving cylinders 17a, 18a, 19a are provided for the respective movable frames 17, 18, 19.

The bolt receiving and delivering means 20 comprises a bolt transferring head 20a attached to a slide frame 21 which is provided on the machine frame 8 and is movable in front and rear directions, and a bolt supplying head 20b fixed to the machine frame 8. Thus, under the condition that bolts supplied through compression air feeding tubes 20c connected to the supplying head 20b are firmly held by respective chucking portions provided on the transferring head 20a, the transferring head 20a is moved, by operating a driving cylinder 21a for the slide frame 21, from its bolt receiving position facing the supplying head 20b to its bolt delivering position facing the foregoing fastening heads 16, 16'. At the delivering position, the respective bolts are set on the respective nut runners 16a, 16a' of the respective fastening head 16, 16'.

Figure 5:
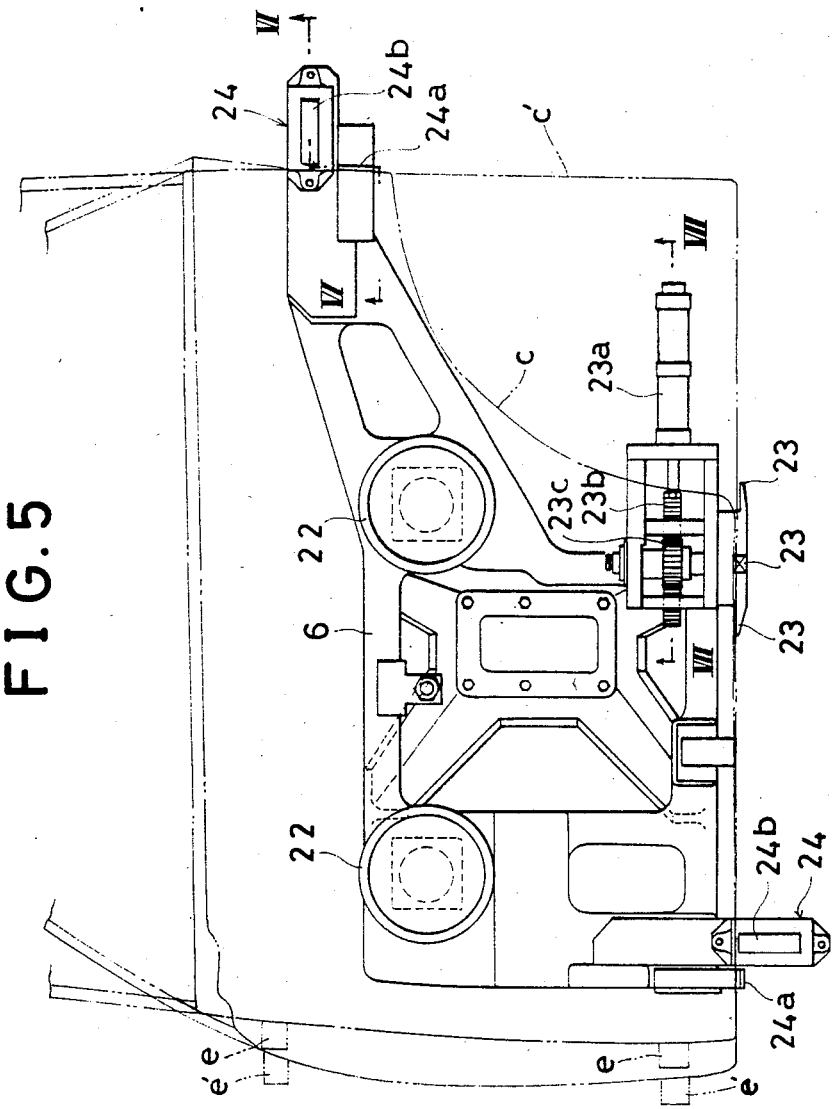
FIG. 5 is a front view of a set jig thereof viewed from the line V—V in FIG. 4.

The above explanation has been made about the whole construction of this invention, and now the detailed construction of the set jig 6 itself will be explained as follows:

As shown clearly in FIG. 5, the set jig 6 is provided with a pair of vacuum pads 22, 22 for attracting and holding each of the doors c, c', a door receiving member 23 for receiving a lower edge of each of the doors c, c', and clearance sensor 24 for measuring a clearance formed between each of the doors c, c' and each of the door opening portions b, b'. Regarding the clearance sensor 24, in the illustrated example, a pair of sensors are disposed so that one of them is for measuring the amount of clearance in the vehicle length direction between a rear side edge of each of the doors c, c' and a rear side edge of each of the door opening portions b, b' and the other is for measuring the clearance amount in the vehicle height direction between lower edges thereof.

Figure 6:
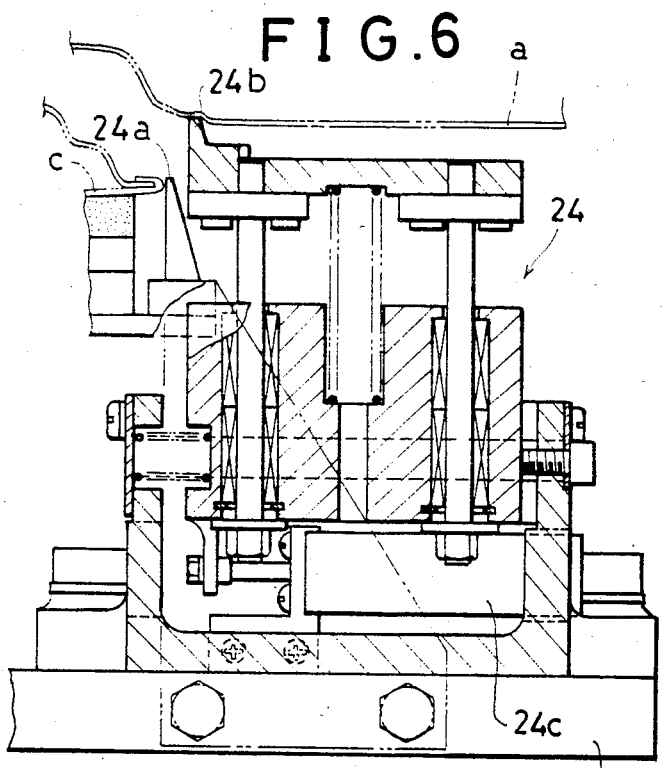
FIGS. 6 and 7 are sectional views thereof taken along the lines VI—VI and VII—VII in FIG. 5.

As shown clearly in FIGS. 5 and 6, each clearance sensor 24 is provided with a stationary claw 24a for engaging a side edge of each door c, c', a movable claw 24b which is provided near the stationary claw 24a and movable in the clearance measuring direction, and a potentiometer 24c for detecting a displacement amount of the movable claw 24b in relation to the stationary claw 24a.

The movable claw 24b provided to be positioned beyond the forward end of the stationary claw 24a is brought into engagement with a side edge of the opening portion before each portions b, b'. Thus, the displacement amount of the movable claw 24b in relation to the stationary claw 24a at that time is detected by the detecting means 24c to calculate or find the clearance amount between each of the doors c, c' and each of the door opening portions b, b'. Then the set jig 6 is finely moved in the vehicle length direction and in the vehicle height direction so that the clearance amount may adjust to a predetermined value, whereby the set jig 6 can be set at a final positioning. Thereafter, each of the doors c, c' is mounted in each of the door opening portions b, b'.

Figure 7:
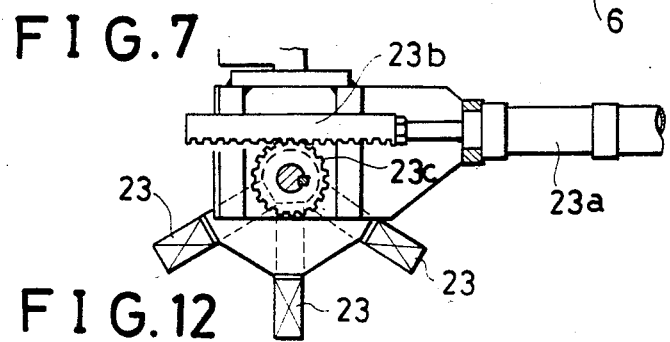

Regarding the door receiving member 23, plural ones thereof different in height one from another are disposed radially, as shown in FIG. 7, considering the fact that the lower edge of the doors are different in shape depending whether it is a rear door c, a front door c' or a door of a different vehicle model. Thus, it is arranged so that any desired one thereof may be selected to be positioned at its operating position for receiving the door lower edge by means of an index mechanism comprising a rack 23b moved with a cylinder 23a and a pinion 23c meshed therewith.

Next, the operation of the foregoing embodying example will be explained as follows:

After, first, the rear door c is introduced through the door introducing means 7 to be set on the set jig 6 located at the door receiving position thereof, the set jig 6 is moved to its original point position corresponding to a normal set position for the rear door opening portion b of the vehicle body a set on the assembling station 1, and is then moved in the vehicle length direction and in the vehicle height direction, in accordance with the positional deviation amount of the rear door opening portion b from the normal set position thereof by the signals outputted from the position detecting means 13. Thus, the set jig 6 is compensated in its original point position. After the completion of this compensation, the set jig 6 is advanced inwards in the vehicle width direction towards the rear door opening portion b, and in the course of this advance movement, the clearance amounts in the vehicle length direction and in the vehicle height direction between the rear door c and the rear door opening portion b are detected by the pair of clearance sensors 24, 24. The final positioning of the set jig 6 is carried out in such a manner that the foregoing clearance amounts become the desired predetermined ones, and the rear door c is then mounted in the rear door opening portion b. Under this condition, by means of the respective nut runners 16a of the fastening head 16, the door hinge e is bolted to a center pillar of the vehicle body a, as shown in FIG. 12, and thus, the assembling of the rear door c with the body a is completed.

After the completion of this assembling, the set jig 6 is returned to the door receiving position thereof, and the front door c' is introduced to be set thereon through the door introducing means 7. Thereafter, the set jig 6 is moved to its original point position corresponding to the normal set position for the front door opening portion b', and in almost the same manner as above, the front door c' is assembled with the front door opening portion b'.

In the foregoing example, the same set jig 6 is used in common for both the front door c' and the rear door c. However, this invention is not limited thereto. Namely, such a modification can be considered that a set jig for the rear door c and another set jig for the front door c' are supported on individual robot mechanisms so that the front door c' and the rear door c may be assembled simultaneously. In this case, the fastening head for the front door and the fastening head for the rear door are separated one from another and these are supported on individual robot mechanisms.

Thus, according to this invention, the set jig is arranged to be movable in the vehicle length direction and in the vehicle height direction by the signal outputted from the position detecting means for detecting the positional deviation of the door opening portion from its normal set position, and thereby the original point position of the set jig can be compensated in accordance with the positional deviation amounts. Thus, the set jig can be advanced towards the door opening portion side under the condition that the same is set in position at the position corresponding to the actual door opening portion. The foregoing inconvenience with the conventional apparatus wherein the positioning of the set jig in relation to the door opening portion is carried out by a locating member provided on the set jig at the time of advance movement thereof is eliminated.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An apparatus for assembling a door for a vehicle wherein a set jig for positioning and setting thereon a door is provided on a side portion of an assembling station, and the set jig is arranged to be movable to advance toward and retreat from a door opening portion of a vehicle body set on the assembling station so that the door may be assembled with the door opening portion by an advance movement of the set jig, the apparatus characterized in that the set jig is so arranged as to be movable in the vehicle length direction and in the vehicle height direction by respective driving sources from a predetermined original point position thereof corresponding to a normal set position of the door opening portion, and in that there is provided a position detecting means for detecting a deviation in position of the door opening portion from the normal set position thereof so that the original point position of the set jig may be compensated, before the advance movement of the set jig, in accordance with the deviation in position of the door opening portion by operating the respective driving sources by a signal outputted from the detecting means.

2. An apparatus as claimed in claim 1, wherein the position detecting means comprises a detecting means main body which is provided on a side portion of the assembling station and movable to advance and retreat in the vehicle width direction; a first rotary member having a shaft extending longitudinally in either one of the vehicle length direction and the vehicle height direction and being pivotally mounted through the shaft on the main body; a secondary rotary member having a shaft extending longitudinally in the other of the vehicle length direction and the vehicle height direction and being pivotally mounted through its shaft on the first rotary member; a feeler needle to be brought into engagement with a reference opening made in a proper position of a side surface of the vehicle body attached to the secondary rotary member; and respective angle detecting means associated with the respective shafts of the two rotary members for detecting rotation angles of those shafts.

* * * * *